United States Patent [19]

Sweeney et al.

[11] Patent Number: 5,572,039

[45] Date of Patent: Nov. 5, 1996

[54] METHOD AND APPARATUS FOR OBSERVING A GAP

[75] Inventors: Michael Sweeney, Newcastle upon Tyne; Michael P. Jenkins, Northumberland, both of England

[73] Assignee: Rolls-Royce Power Engineering plc, Newcastle upon Tyne, England

[21] Appl. No.: 290,814

[22] PCT Filed: Feb. 3, 1993

[86] PCT No.: PCT/GB93/00224

§ 371 Date: Aug. 15, 1994

§ 102(e) Date: Aug. 15, 1994

[87] PCT Pub. No.: WO93/17296

PCT Pub. Date: Sep. 2, 1993

[30] Foreign Application Priority Data

Feb. 29, 1992 [GB] United Kingdom ............... 9204413

[51] Int. Cl.$^6$ ................................................. G01N 21/86
[52] U.S. Cl. ..................... 250/559.3; 250/559.14; 250/237 R; 250/214 PR; 356/386
[58] Field of Search .................. 250/559.3, 559.12, 250/559.13, 559.14, 237 R, 214 PR; 356/386, 387

[56] References Cited

U.S. PATENT DOCUMENTS

| | | | |
|---|---|---|---|
| 3,859,617 | 1/1975 | Oka et al. | 338/15 |
| 3,908,444 | 9/1975 | Peter | 73/71.3 |
| 4,021,119 | 5/1977 | Stauffer. | |
| 4,049,644 | 9/1977 | Wennerstrom. | |
| 4,114,035 | 9/1978 | Herzog | 250/214 PR |
| 4,180,931 | 1/1980 | Osch | 40/219 |
| 4,284,885 | 8/1981 | Swensen | 250/214 PR |
| 4,584,510 | 4/1986 | Hollow | 318/584 |
| 4,716,942 | 1/1988 | Jensen et al. | 139/370.2 |
| 4,812,635 | 3/1989 | Kaufmann et al. | 250/231 R |
| 5,079,432 | 1/1992 | Miller | 250/561 |

FOREIGN PATENT DOCUMENTS 0353076   1/1990   European Pat. Off. .

OTHER PUBLICATIONS

NTIS Tech Notes Feb. 1988, Springfield, VA US p. 100, XP2538 'fibre optic lateral displacement sensor'.

*Primary Examiner*—Edward P. Westin
*Assistant Examiner*—Stephen Calogero
*Attorney, Agent, or Firm*—Cushman Darby & Cushman, L.L.P.

[57] ABSTRACT

The assessment of clearance conditions in an operating turbine structure has provide difficult to achieve. The invention provides apparatus which enables the clearance between seal fins on rotating blades and adjacent fixed structure, to be observed during rotation, and comprises refracting prisms (30, 32) on the fixed structure arranged so as to straddle sealing fin (14) on the blades. The stage of blades on their associated disc are moved towards the fixed structure and light which is refracted through the prisms is obscured by the fins. In one embodiment, the ratio of obscured to unobscured light is utilised to generate electrical signals, which are then manipulated so as to indicate the magnitude of the clearance.

13 Claims, 4 Drawing Sheets

Fig. 3
Fig. 3A
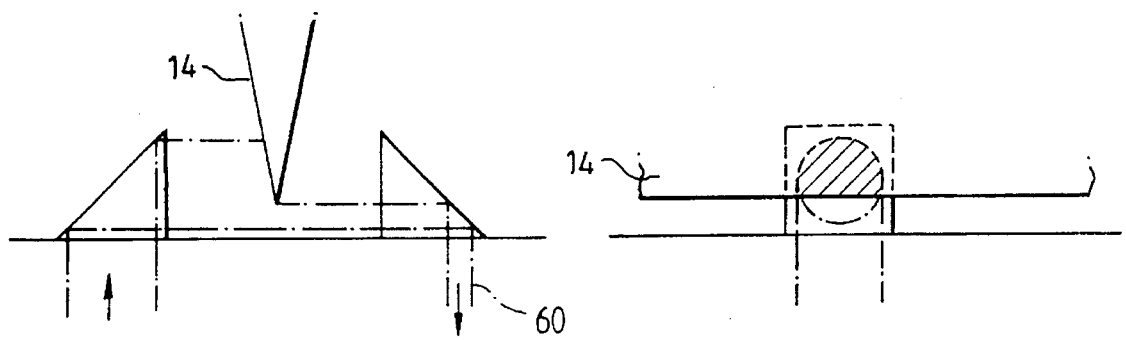
Fig. 4
Fig. 4A
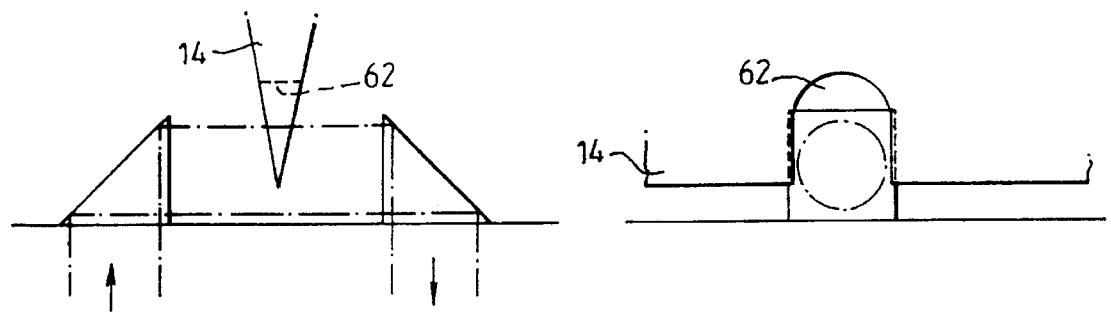
Fig. 5
Fig. 5A
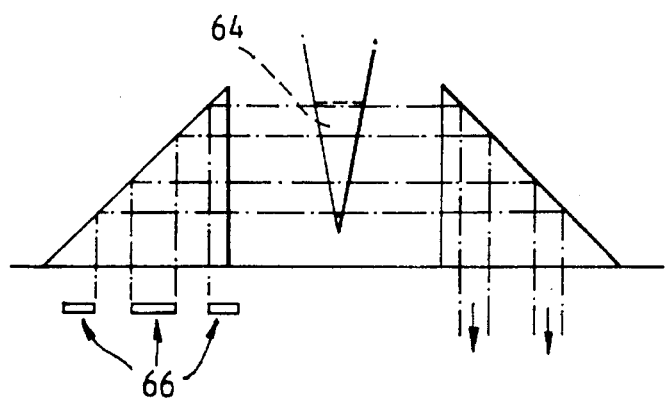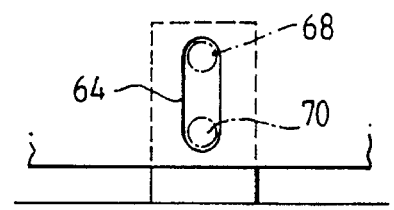

METHOD AND APPARATUS FOR OBSERVING A GAP

FIELD OF THE INVENTION

This invention relates to the observing of the magnitude of an axial gap between relatively rotating parts in a fluid flow engine.

SUMMARY OF THE INVENTION

The invention has particular efficacy when used to observe the running clearance between, say, fixed stators and rotating turbine blades and between blade shroud fins and a casing surrounding them.

According to the present invention a method of observing a gap between relatively rotating parts comprises connecting first and second radiation transmitting members to a fixed part of a turbine, the first and second members being in a spaced relationship and are arranged so that the members protrude towards an opposing face of a rotatable part of the turbine, the first and second members being adapted and aligned relative to one another to direct a beam of radiation from the first transmitting member to the second transmitting member, positioning a projection on said opposing face to ensure passage thereof between the first and second members during rotation of the rotatable part, measuring the amount by which the beam of radiation passing between the first and second members is obscured by the projection so as to provide an indication of the magnitude of the gap.

The invention further provides apparatus for effecting the method. Apparatus fixed in a turbine comprises first and second radiation transmitting members which are connected in spaced relationship to a fixed part of the turbine so that the members protrude towards an opposing face of a rotatable part of the turbine, the first and second members being adapted and aligned relative to one another to direct a beam of radiation from the first transmitting member to the second transmitting member characterised in that a projection is positioned on the opposing face to ensure passage thereof between the first and second members during rotation of the rotatable part, means being provided for measuring the amount by which the beam of radiation passing between the first and second members is obstructed when the projection on the opposing face of the rotatable part of the turbine passes between the members.

The invention will now be described, by way of example and with reference to the accompanying drawings in which:

BRIEF DESCRIPTION OF THE DRAWINGS

FIG. 2 is an exploded view of one embodiment of radiation beam reflecting means in accordance with the present invention and FIGS. 3, 3A, 4, 4A, 5, 5A, 6, 6A, 7, and 7A depict various beam obsuring features which enable signals to be extracted when applied to the embodiments of FIGS. 1 and 2.

DETAILED DESCRIPTION OF THE INVENTION

Figure 1:
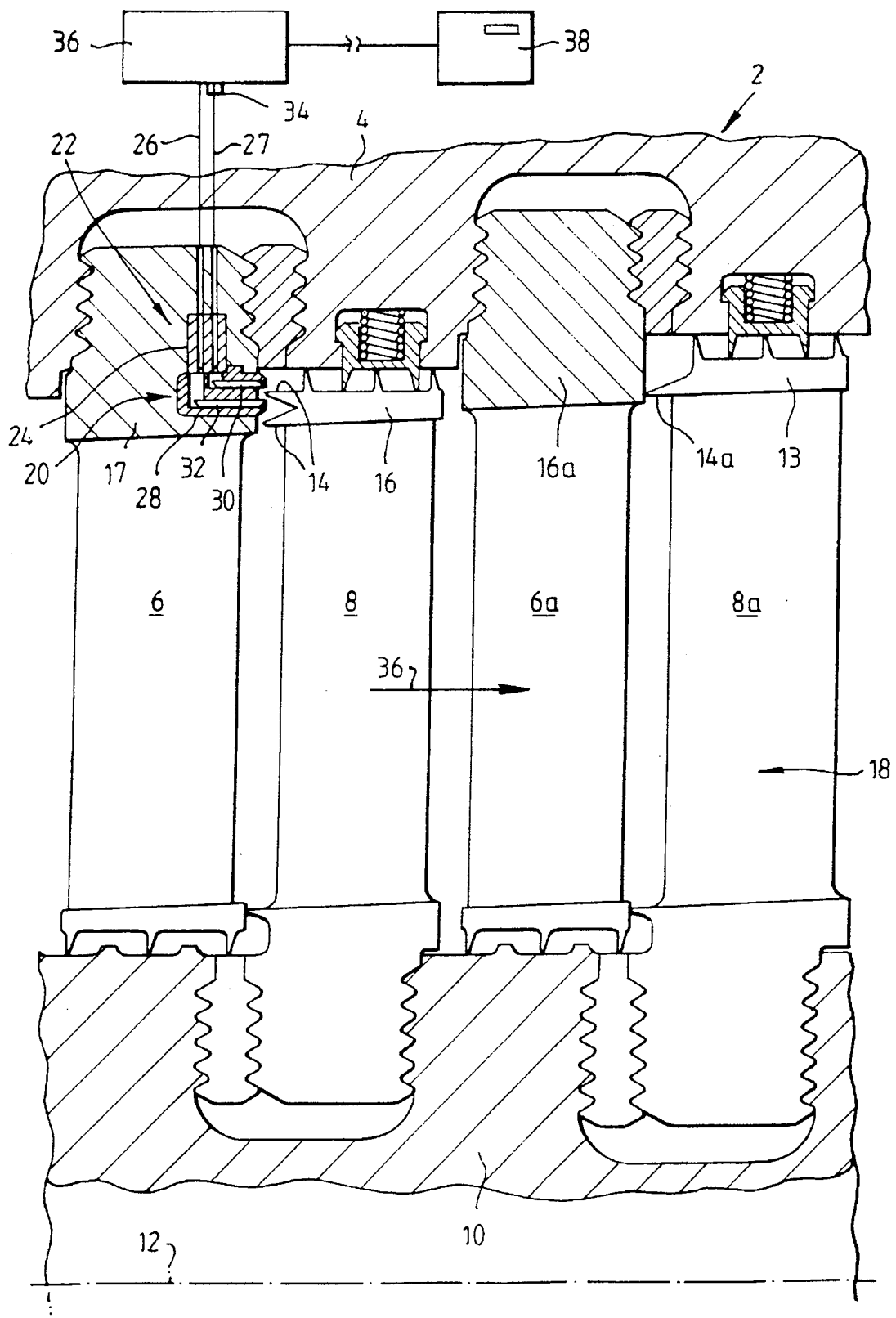
FIG. 1 is a diagrammatic, axial cross sectional view of an array of fixed stators and rotatable turbine blades, incorporating an embodiment of the present invention.

Referring to FIG. 1. A turbine 2 includes a casing 4 in which two stages of stator blades 6 and 6a are fixed via their outer ends.

A first stage of blades 8 lies immediately downstream of the stator stage 6 and a second stage of blades 8a lies immediately downstream of stator stage 6a.

Both stages of blades 8 and 8a are carried in a drum for rotation about an axis 12.

The blades 8a have shrouds 12a at their outer ends in known manner. Each shroud 12a has an axially directed fin, 14a extending towards the opposing face of roots 16a at the outer ends of stators 6a. The fins 14a together provide an annular seal against massive egress of fluid from the turbine annulus 18.

It is known to provide fins of the kind described herein for the stated purpose. Such arrangements however, have drawbacks, e.g. the fins can have their sealing efficiency destroyed as a result of excessive rubbing against the opposing face of the stator roots. In the present example therefore, the blades 8 are modified, which modification, in conjunction with a device 20 to be described hereinafter, enables the observation of the changes in the gap between the extremity of the fins 14 and the opposing face of the shroud of the stator 6 and therefore the gap between the fins 14a and the opposing face of the stator 6a, since the stages of blades 8 and 8a are Joined via the drum 10.

Each blade 8 has a radially spaced pair of fins 14 on the upstream face of a shroud 16. A device 22 which in the present example is a first housing 24 in which a pair of fibre optics 26, 27 are fitted, and a second housing 28 which contains a pair of radially spaced, elongate prisms 30 and 32, is carried in the root 17 of the stator 6. The specific example is more fully described hereinafter, with respect to FIG. 2.

Referring still to FIG. 1. The prisms 30, 32 are arranged with their lengths parallel with the axis of rotation 12, and with their free ends projecting beyond the downstream face of the stator root 17 so as to just straddle the tip of the radially outer fin 14 when the turbine is inoperative.

The radially outer prism 30 has its inner, chamfered end aligned with the fibre optic 27, and the radially inner prism 32 has its inner chamfered end, aligned with the fibre optic 26. The protruding chamfered ends of the prisms 30, 32 are radially aligned with each other.

A radiation source 34 which can be a light emitting diode, is connected to the fibre optic 27. The radiation is in the form of light.

During operation of the turbine, the loads exerted on the blades 8 and 8a force them in a downstream direction, as indicated by the arrow 36. Thus, the gaps between fin tips and stator root surfaces increase and need to be adjusted. This is achieved by applying an axial force to the shaft (not shown) to which the drum 10 is connected, in an upstream direction. Presently, contact between fins and root surfaces is the only indication of relative positions of the stator roots and fins. Thus, initial wear by friction is generated.

The present invention obviates friction in the following manner; on start up of the turbine, a light from source 34 is passed down fibre optic 27, to the chamfered inner end of the prism 30, which reflects the light along its length and then reflects it further from its outer end, onto the outer end of the radially inner prism 32. The light is further reflected by the prism 32, to the fibre optic 26 which in turn guides the light to a black box 36.

A transducer (not shown) in the black box 36 converts the light to an electrical signal, which is then passed to sample and hold, dividing and ratioing circuitry within the box 36. The circuitry itself is not inventive and can be devised by a competent electronics engineer.

Immediately after start up, the turbine is forced by known means (not shown) in an upstream direction, thus causing the radially outer annular fin 14 on the shroud 16 to penetrate the beam of light which extends from prism 27 to prism 26.

The transducer (not shown) senses the reduced exposure and changes its output to the circuitry (not shown). In consequence of this, further signals are generated and passed to a display 38 which will display, preferably in digital form, the magnitude of the gap between the tip of the fins 14 and the opposing face of the stator root 17. As the turbine moves further, so the gap reduces, and the circuitry in the black box 36 changes its output to the display 38, as appropriate. Thus throughout the manoeuvre, the magnitude of the gap is known and when the display indicates the achievement of a pre selected gap size, movement of the turbine can be stayed.

Figure 2:
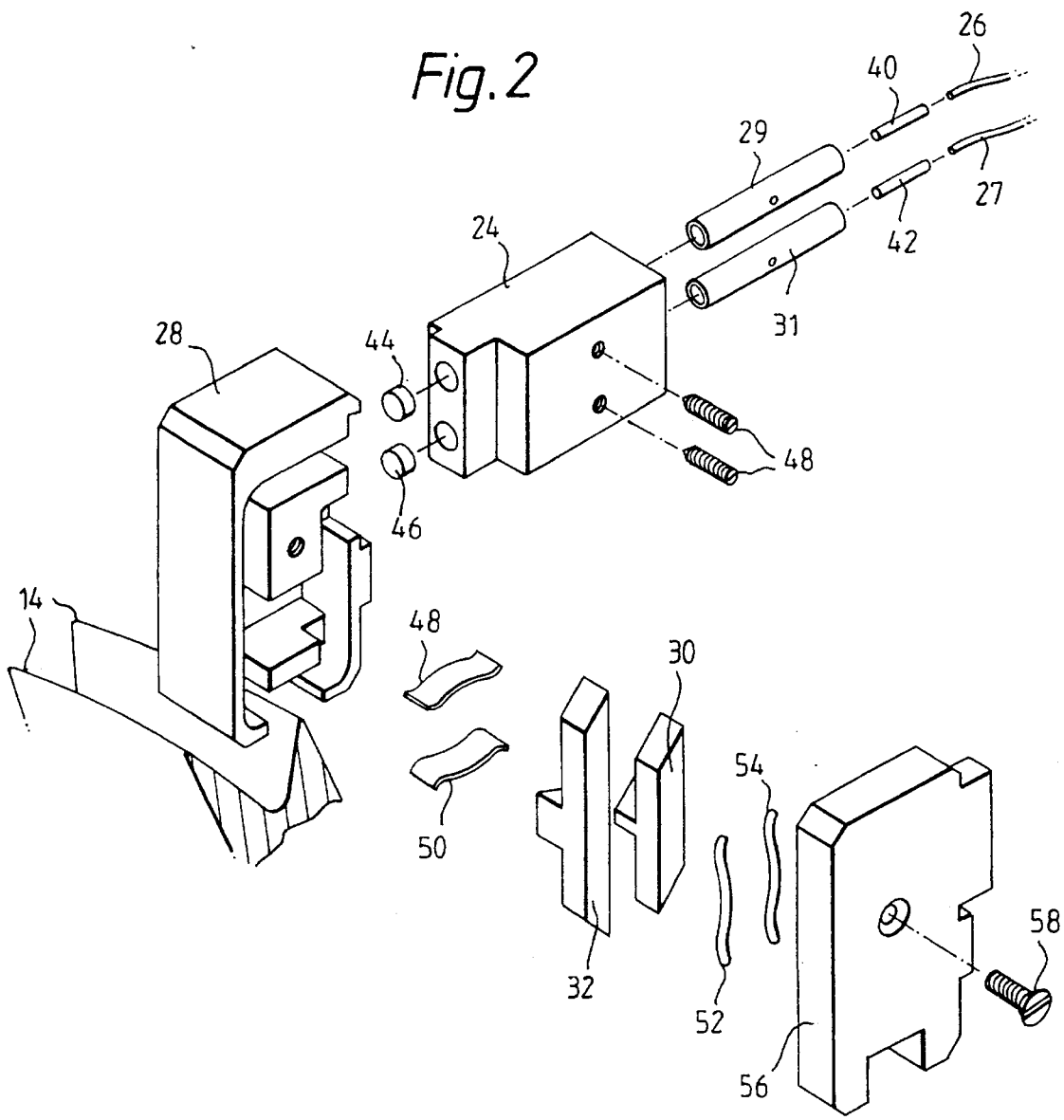

Referring to FIG. 2. The fibre optics which are gold jacketed, are brazed into respective fibre tubes 40, 42. The tubes 40, 42 in turn, are a sliding fit in respective lens tubes 29, 31 which in turn fit in bores in the housing 24. A pair of sapphire lenses 44, 46 are fixed in the ends of the bores and the tubes 40, 42 are moved therein, until light beams passing through them are collimated by the lenses 44, 46. Grub screws 48 are then screwed into the housing 24, to trap the tubes 40, 42 against further movement.

The housing 28 is recessed to accept the end of the housing 24 which contains the lenses 44, 46 and is further recessed so as to accept the prisms 30, 32. Leaf springs 48, 50, 52, and 54, resiliently locate the prisms 30, 32 in their appropriate positions in the housing 28. After the leaf springs and prisms have been fitted in the housing 28, a corer 56 is fitted and held by a screw 58.

Referring to FIG. 3. This shows the obscuring of the reflected light beam by the radially out fin 14, and the reflection of the non obscured portion 60 through the prism 32.

FIG. 3a depicts the ratio of obscured beam area, to an non obscured beam area, as achieved by the fin 14 of FIG. 3.

FIG. 4 includes a local notch 62 formed in the fin 14. As is more clearly seen in FIG. 4a, the notch 62 is deep enough to ensure that the whole beam passes through it, to the prism 32, each time the notch 62 passes the beam during rotation of the turbine. By this means the obtaining of the ratio of the full beam to obscured beam is enabled, rather than merely relying on a beam of reducing cross sectional area.

FIG. 5 depicts a slot 64 in the fin 14 and masking 66 applied to the prism 30, so as to form two reflected beams. The beam spacing is such that they both are totally embracable by the slot 64, one at each end thereof.

The arrangement provides a clear indication of the direction of axial movement of the turbine. Thus if the turbine starts from the position indicated in FIG. 5a with respect to the beams and moves towards the face of the stator root 17, the fin will obscure only the beam 68. If the turbine withdraws, it will only obscure the other beam 70.

The arrangement further provides the opportunity to pre-set an optimum position of the turbine, and enable observing of movement of the turbine relative thereto, in either direction with respect to the opposing face of the stator root 17.

Figure 6:
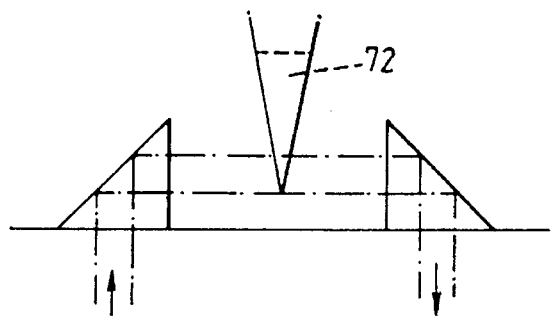
Figure 6A:
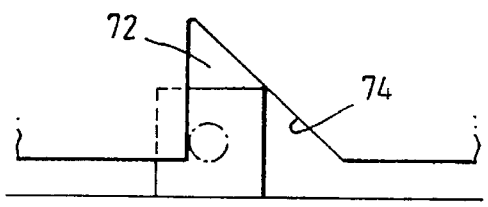

FIG. 6 and 6a depict a notch 72 which has one sloping side 74. In this arrangement, the sloping side 74 starts to obscure the beam at an increasing rate as the turbine moves towards the stator roof 17, and a decreasing rate, as the turbine retreats therefrom. Thus, the arrangement is a mark/space sensor, which also provides an indication of direction of movement.

Figure 7:
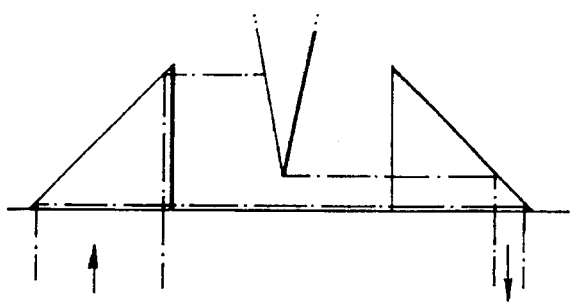
Figure 7A:
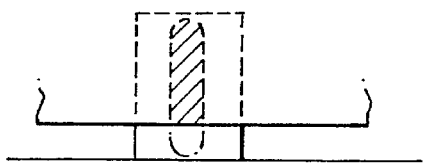

FIGS. 7 and 7a illustrate the ability of the device, to provide signals by sensing the change in wave length of the light, as the beam becomes more or less obscured.

Referring back to FIG. 1. The radially inner fin 14 is provided so as to shield the prisms 30, 32 from the hot fluids passing through the turbine.

Figure 8:
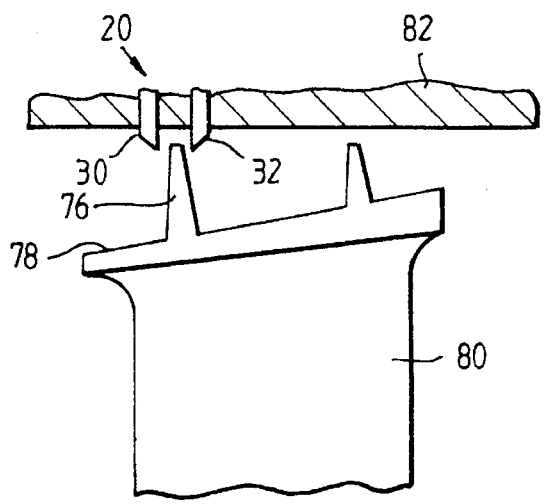
FIG. 8 depicts an alternative embodiment of the present invention.

Referring now to FIG. 8. An alternative embodiment of the present invention utilizes the device 20 for the purpose of observing tip clearance between the tips of fins 76 in the shrouds 78 of turbine blades 80.

The device 20 is rotated through 90° and fitted within the turbine casing 82. Only the prisms 30 and 32 are shown, and they straddle the fin 76. Thus, as the blade extends under centrifugal force towards the casing wall, the refracted light beam is obscured. Apart from location and orientation, the embodiment of FIG. 8 is exactly the same in content and operation, as that described with respect to FIGS. 1 to 7a.

What is claimed is:

1. A method of observing a gap between relatively rotating parts of a turbine of the type having an axis of rotation for the rotating parts and parts fixed relative to the axis of rotation, the method comprising the steps of mounting a pair of radiation reflecting members on a portion of one of said fixed parts so as to protrude toward a rotating part that is adjacent said one of said fixed parts of the turbine, said reflecting members being located in reflecting alignment and spaced apart radially relative to each other and said axis of rotation to provide an optical path that extends between said reflecting members in a radial sense with respect to said axis of rotation, positioning a projection on the rotating part so that said projection passes between said reflecting members during rotation of the turbine to produce an effect on any light passing along the optical path that is correlated to the magnitude of the gap, the optical path including a transducer and including the step of passing a beam of light from a light source to the transducer along the optical path so that the transducer will provide an indication of the magnitude of the gap.

2. A method of observing a gap as claimed in claim 1 characterised by including the step of providing a notch in the projection, the notch allowing the whole cross sectional area of the beam to pass therethrough, so as to intermittently enable comparison of the obscured and unobscured beam of radiation.

3. A method of observing a gap as claimed in claim 2 characterised in that said notch is 'v' shaped and is orientated such that one side thereof is parallel with the axis of rotation on the turbine so as to provide a space sensor.

4. A method of observing a gap as claimed in claim 1 characterised by including the step of providing a slot in the projection and masking the first transmitting member to produce two beams of radiation which are transmitted through the first member, the spacing of the two beams being such that both beams may pass through the slot.

5. A method as claimed in claim 1 characterised in that the gap is defined by a stage of stator vanes of the turbine and an array of sealing fins on an adjacent stage of turbine blades of the turbine.

6. A method of observing a gap as claimed in claim 1 characterised in that the gap is defined by a turbine casing and an array of sealing fins on an adjacent stage of turbine blades of the turbine.

7. An apparatus fixed in a turbine so as to enable a gap to be measured between turbine parts mounted for relative rotation about an axis of rotation, comprising first and second radiation transmitting members which are connected in spaced apart relationship to a fixed part of the turbine so that said first and second radiation transmitting members protrude towards an opposing face of a rotatable part of the turbine, a source of radiation, said first and second radiation transmitting members being aligned relative to one another to direct a beam of radiation from said source of radiation to said first radiation transmitting member and then to said second radiation transmitting member along an optical path that extends radially relative to the axis of rotation of the turbine, another part of said turbine including a rotating part having a face opposing said first and second radiation transmitting members and including a projection on said face positioned to assure passage of said projection between said first and second radiation transmitting members during rotation of said another part of said turbine, a measuring device being provided for measuring the amount by which the beam of radiation passing between said first and second radiation transmitting members is obstructed when the projection on said opposing face of said another part of the said turbine passes between said first and second radiation transmitting members.

8. An apparatus as claimed in claim 7 wherein the fixed part of said turbine is a stator vane in a stage of stator vanes in said turbine, said stator vane having a root, said first and second radiation transmitting members being supported in said root of said stator vane.

9. An apparatus as claimed in claim 7 wherein said first and second radiation transmitting members are prisms which transmit the beam of radiation by internal reflection.

10. An apparatus as claimed in claim 9 wherein said prisms have ends which protrude towards said opposing face of said another part of said turbine and are chamfered and aligned relative to one another to direct a beam of radiation from said first radiation transmitting member to the second radiation transmitting member.

11. An apparatus as claimed in claim 7 wherein the measuring device comprises a signal generator which converts an unobstructed beam of radiation to an electrical signal.

12. An apparatus as claimed in claim 11 wherein the electrical signals generated by the signal generator are manipulated into visual signals.

13. An apparatus as claimed in claim 12 wherein the source of radiation and the signal generating means are both located on said fixed part of said turbine.

\* \* \* \* \*